Figure 1:
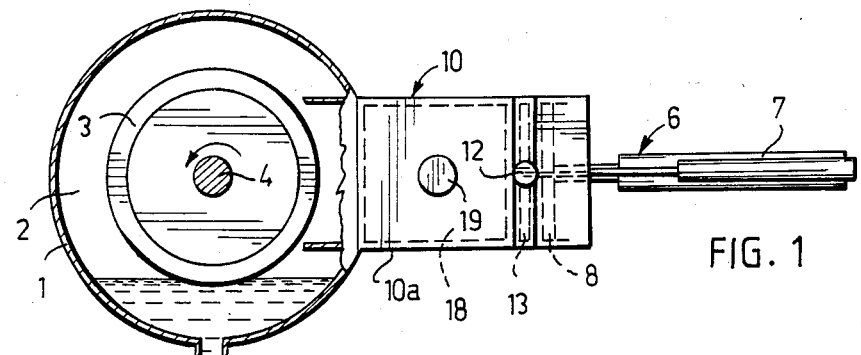

United States Patent [19]

Ahonen et al.

[11] Patent Number: 4,664,323

[45] Date of Patent: May 12, 1987

[54] METHOD OF AND A FEEDING DEVICE FOR FEEDING A WOOD BATCH INTO A PRESSURE GRINDER

[75] Inventors: Juhani Ahonen; Pekka Haikkala; Raimo Pessa, all of Tampere, Finland

[73] Assignee: Oy Tampella AB, Tampere, Finland

[21] Appl. No.: 672,417

[22] Filed: Nov. 16, 1984

[30] Foreign Application Priority Data

Jan. 9, 1984 [FI] Finland ................................ 840070

[51] Int. Cl.⁴ .......................................... B02C 19/12
[52] U.S. Cl. ..................................... 241/282; 241/28
[58] Field of Search ................. 241/28, 280, 281, 282, 241/5, 39, 40

[56] References Cited

U.S. PATENT DOCUMENTS 4,101,081 7/1978 Ritter et al. ................... 241/282 X
4,305,590 12/1981 Haikkala et al. .............. 241/282 X
4,405,091 9/1983 Bahr et al. ..................... 241/282 X

FOREIGN PATENT DOCUMENTS 864509 7/1949 Fed. Rep. of Germany ...... 241/282

57979 7/1980 Finland.

Primary Examiner—Mark Rosenbaum
Attorney, Agent, or Firm—Ladas & Parry

[57] ABSTRACT

A method for feeding a wood batch into a pressure grinder, according to which method the wood batch is first fed into a pressurizable feeding device (9) and thereafter from the feeding device into a continuously pressurized grinding chamber (5) to make contact with a grinding means (3) rotating in the grinding chamber. The wood batch is fed from the feeding device into the grinding chamber essentially in a horizontal plane in the direction of the axis (4) of rotation of the grinding means for maintaining proper order of the wood batch during the feeding operation. In a feeding device for carrying out the method the feeding device (9) is positioned on the side of the grinding chamber (5) so that the bottom (10a) of the feeding pocket (10) formed by the feeding device is essentially in level with the bottom (5a) of the grinding chamber. The feeding device is provided with a pushing means (17) displaceable in the feeding pocket towards the grinding chamber in parallel with the level of the bottom.

5 Claims, 14 Drawing Figures

METHOD OF AND A FEEDING DEVICE FOR FEEDING A WOOD BATCH INTO A PRESSURE GRINDER

This invention relates to a method of feeding a wood batch into a pressure grinder, according to which method the wood batch is transferred first into a pressurizable feeding device and thereafter from the feeding device into a continuously pressurized grinding chamber to make contact with a grinding means rotating in the grinding chamber.

Finnish Patent Specification No. 57,979 discloses a feeding method for wood batches, according to which method wood batches are fed into a grinding chamber from above through a feeding pocket. A transporting device first positions a wood batch on an upper shutter of the feeding pocket. After a lower shutter to the grinding chamber is closed, the feeding pocket is depressurized and the upper shutter is opened, whereby the wood batch falls freely down on the lower shutter. The feeding pocket can be pressurized to the same pressure as the grinding chamber by closing the upper shutter. When the lower shutter is opened, the wood batch falls freely into the grinding chamber and the grinding can be started.

In the described known feeding method two free falls are required for transferring a wood batch into the grinding chamber. As the wood batches are in an uncontrollable condition during the free fall, they are possibly disordered, which causes problems in the grinding operation and reduces the quality of the groundwood stock. An other major disadvantage in this method is that it requires a high constructional space which causes high costs.

The object of this invention is to provide a method which eliminates the above disadvantages and enables a controlled feeding of wood batches from the atmosphere to a grinding chamber under overpressure. This object is achieved by means of the method according to the invention, which is characterized in that the wood batch is fed from the feeding device into the grinding chamber in the direction of the axis of rotation of said grinding means.

The invention is based on the idea that the wood batch is fed into the grinding chamber from the side, whereby the transferring movements of the wood batch can be carried out only in the horizontal plane, while it is not necessary at all to transfer the wood stocks in the vertical direction. On account of this the mutual order of the wood stocks is maintained considerably more accurate during the feeding operation and the stocks remain essentially parallel in spite of that the wood batch is still fed into the grinding chamber through a feeding pocket which operates as a pressure lock.

It is possible to transfer the wood batch into the feeding pocket in the same direction as the wood batch is transferred from the feeding pocket into the grinding chamber or the wood batch can be transferred into the feeding pocket in a direction perpendicular to said direction.

The invention also concerns a feeding device for carrying out the feeding method described above in a pressure grinder which comprises feeding device for a pressure grinder said device comprising a frame forming a pressurizable grinding chamber, a rotating grinding means mounted in the grinding chamber, a feeding device attached to the grinding chamber and forming a feeding pocket for feeding a wood batch into the grinding chamber, closing means for pressure-tight closing of the feeding pocket from the atmosphere and from the grinding chamber respectively, and a pressing element for pressing the wood batch against the grinding means in the grinding chamber.

The feeding device is characterized in that the feeding device is positioned on the side of the grinding chamber in such a manner that the bottom of the feeding pocket is essentially in the same level with the bottom of the grinding chamber, and that the feeding device is provided with a pushing means displaceable in the feeding pocket towards the grinding chamber in parallel with said bottom level.

A feeding device of this type does not increase the constructional height of the grinder, because it is possible to position the feeding device on the side of the grinding chamber.

The pushing device which is required for transferring the wood batch into the feeding pocket and from the feeding pocket into the grinding chamber can be accomplished in several different ways, as described below. The pushing device is preferably displaced inside the feeding pocket together with the wood batch, when the feeding pocket is closed from the atmosphere and pressurized.

Figure 2:
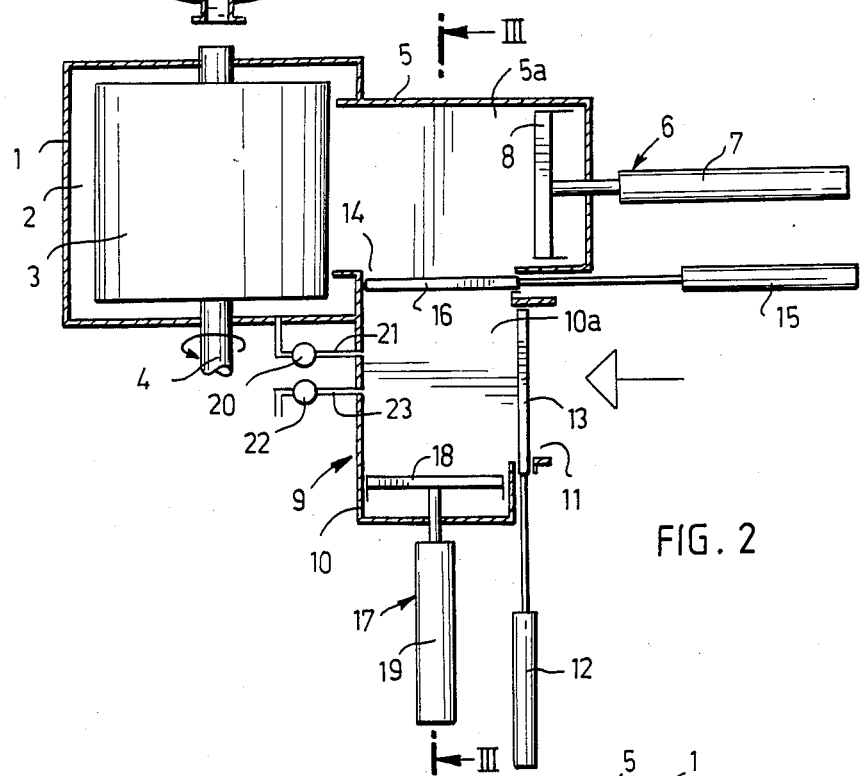
Figure 3:
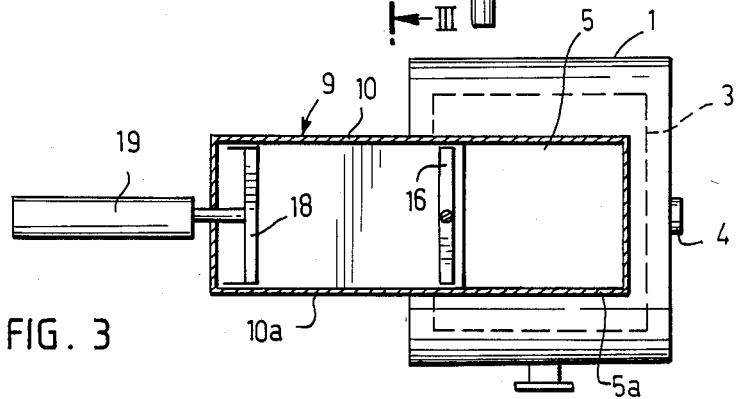
Figure 4:
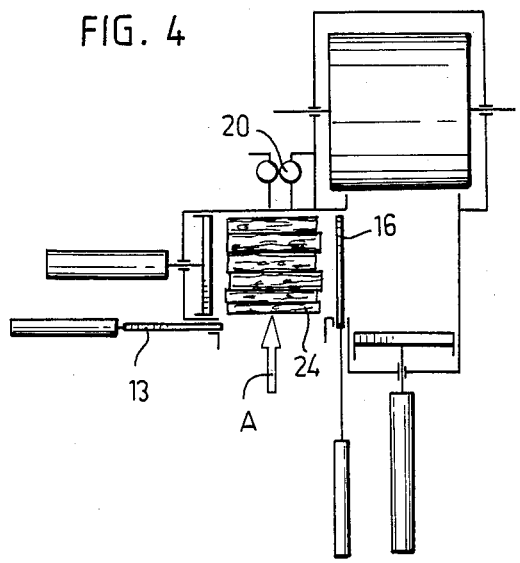
Figure 5:
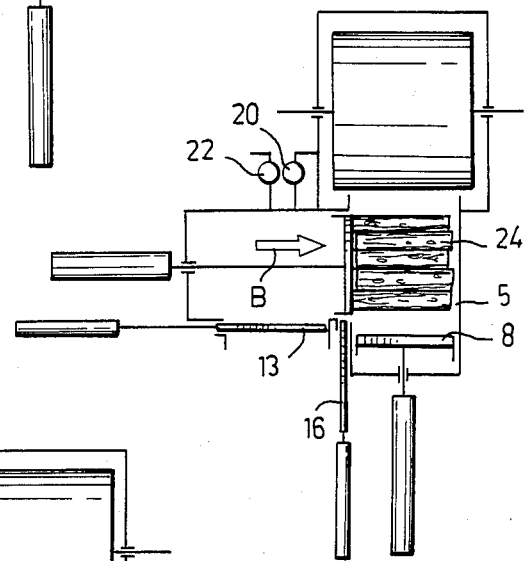
Figure 6:
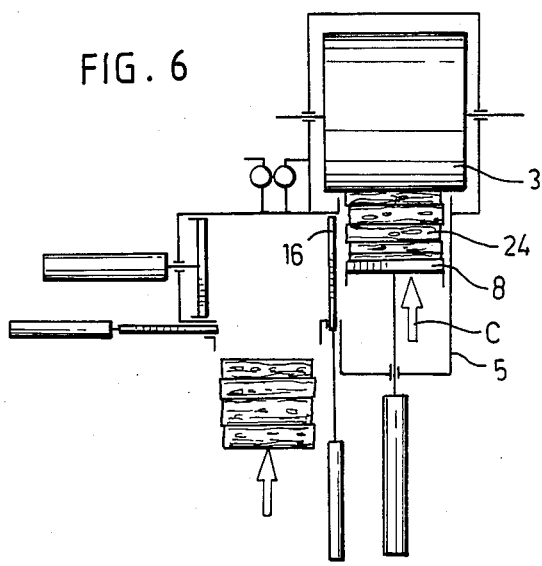
Figure 7:
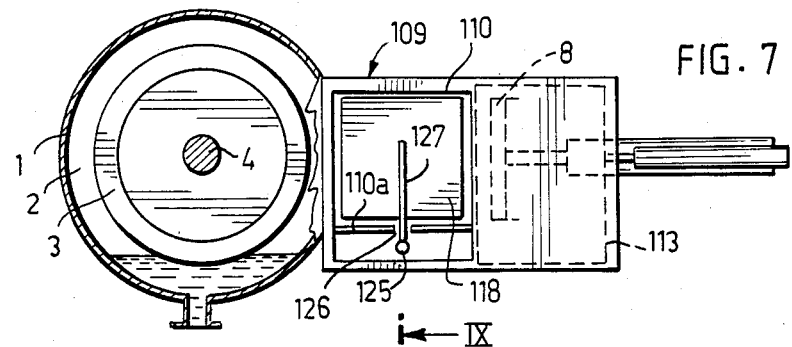
Figure 8:
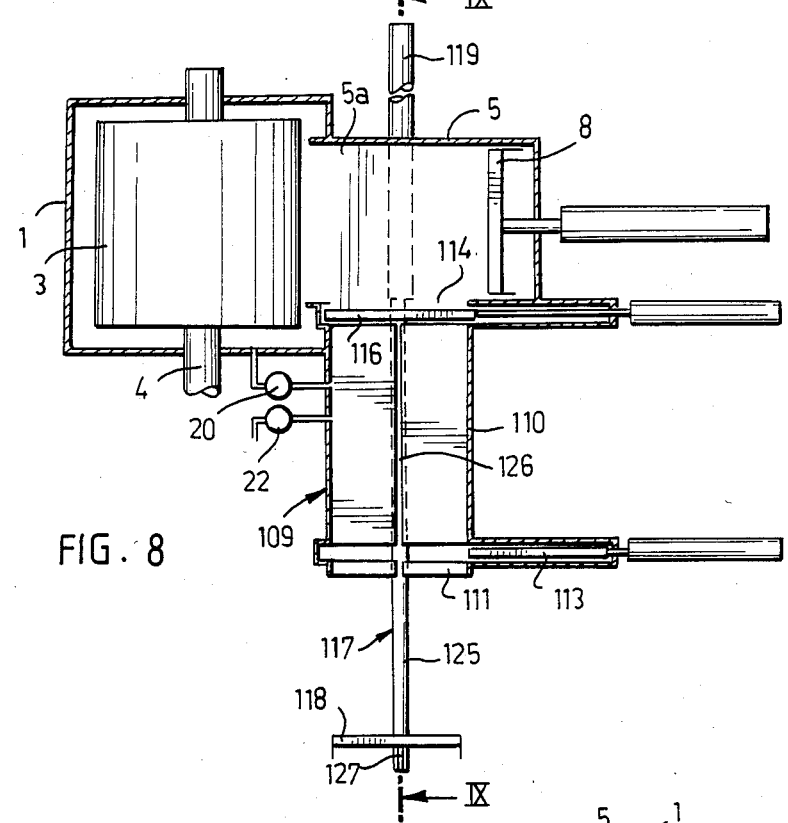
Figure 9:
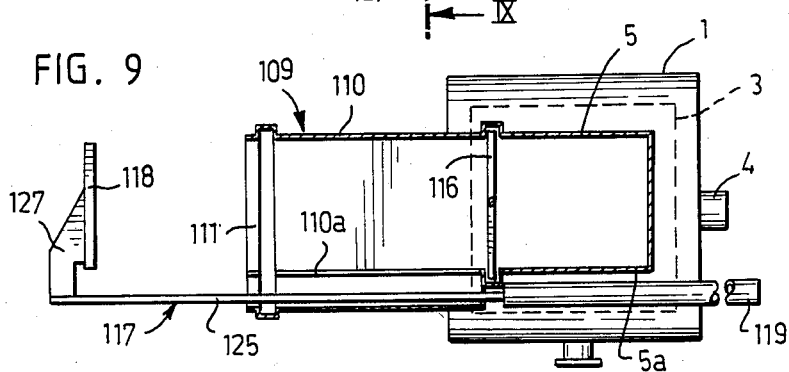
Figure 11:
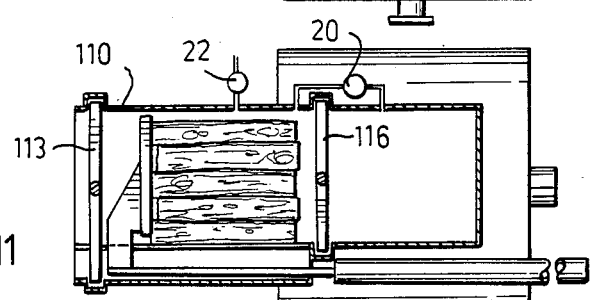
Figure 12:
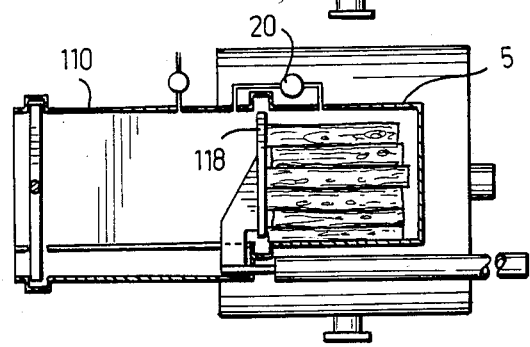
Figures 13, 14:
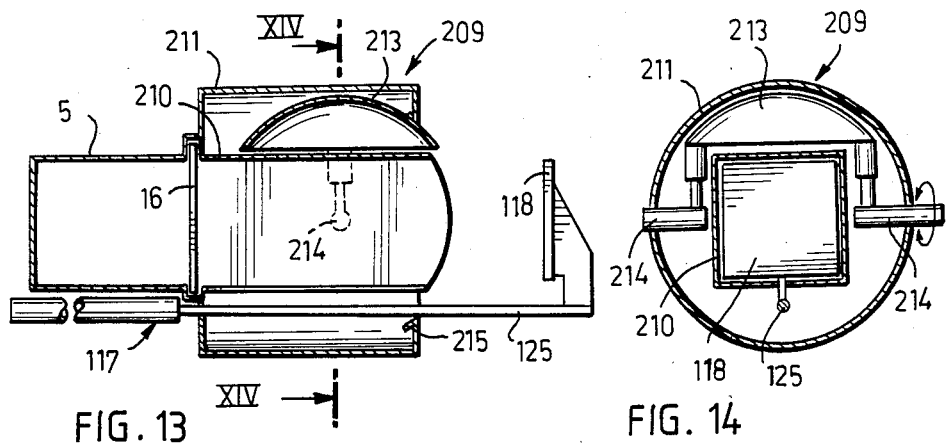

The invention will be described in more detail in the following with reference to the attached drawings, wherein FIGS. 1–3 illustrate a pressure grinder provided with a feeding device according to the invention in a side view as a partial vertical section, in a top view as a partial horizontal section and in an end view as a partial vertical section respectively, FIGS. 4–6 are schematical top views of three different transfer steps for feeding a wood batch, FIGS. 7–9 illustrate a pressure grinder provided with an alternative feeding device essentially in a similar way as in FIGS. 1–3, FIG. 10–12 are schematical top views of three different transfer steps for feeding a wood batch, and FIGS. 13 and 14 are a side view and an end view respectively in a partial vertical section of one preferred embodiment of a sluice of the feeding device.

The grinder illustrated in FIGS. 1–3 of the drawings mainly comprises a pressure-tight, cylindrical frame 1 forming a grinding space 2, in which a grinding stone 3 is rotatably mounted by means of a rotation axis 4 which is connected with a rotation motor not shown. The frame comprises a box-like grinding chamber 5, one end thereof being open towards the grinding stone, the opposite end being restricted by a shoe 8 operated by a hydraulic cylinder 7 of a pushing element 6.

A feeding device 9 according to the invention is positioned on one side of the grinding chamber, said feeding device forming a box-like pressure-tight feeding pocket 10, the bottom 10a of which is positioned in the same horizontal plane as the bottom 5a of the grinding chamber. An inlet opening 11 is provided on the side of the grinding pocket, which opening communicates with the atmosphere and is closed pressure-tightly by means of a sluice 13, which is operated by a hydraulic cylinder 12. The other end of the feeding pocket is provided with an outlet opening 14, which communicates with the grinding chamber and is pressure-tightly closed by means of a sluice 16 operated by a hydraulic cylinder 15. The opposite end of the feeding pocket is restricted by a pushing plate 18 of a pushing device 17, said plate being displaceable by means of a hydraulic cylinder 19 towards said outlet opening.

As appears from FIGS. 1-3, the construction is such that the movement of the pushing plate 18 of the feeding device is parallel with the horizontal rotation axis of the grinding stone.

The feeding pocket communicates with the grinding space by means of a pressurizing pipe 21 which is closed by a valve 20, and with the atmosphere by means of a depressurizing pipe 23 which is closed by a valve 22.

The feeding device according to the invention operates as follows:

When the inner shutter 16 of the feeding pocket and the valve 20 of the pressurizing pipe have been closed and the feeding pocket thereby is closed from the pressurized grinding chamber, the outer shutter 13 of the feeding pocket can be opened and a wood batch 24 can by means of a transfer device, not shown, be pushed in the horizontal direction into the feeding pocket, as shown in FIG. 4 by the arrow A.

Thereafter the outer shutter 13 of the feeding pocket is closed and the feeding pocket is pressurized by closing the valve 22 of the depressurizing pipe and by opening the valve 20 of the pressurizing pipe. The inner shutter 16 of the feeding pocket is opened, whereby the wood batch can be pushed into the grinding chamber 5, when the shoe 8 is displaced to a retracted position, as shown in FIG. 5 by the arrow B.

Finally, the inner shutter 16 of the feeding pocket is closed, whereafter the grinding is started by pressing the wood batch against the grinding stone by means of the shoe, as illustrated in FIG. 6 by the arrow C.

It is noted that the transfer of the wood batch into the feeding pocket and further from the feeding pocket into the grinding chamber entirely takes place in the horizontal plane. Thereby dropping of the wood batch during the feeding operation is avoided and a proper order of the wood batch is maintained. The transfer of the wood batch from the feeding pocket into the grinding chamber takes place in parallel with the rotation axis of the grinding stone.

After the grinding of the wood batch has been completed, the valve of the pressurizing pipe is closed and the valve of the depressurizing pipe is opened so that the feeding pocket is depressurized. After the outer shutter has been opened, a new wood batch can be fed into the feeding pocket and thereafter be fed into the grinding chamber.

The feeding device illustrated in FIGS. 7-9 differs from the feeding device described above essentially only with respect to the position of the outer sluice of the feeding pocket and the pushing device for the wood batch. Therefore, the corresponding parts are indicated with the reference numerals of FIGS. 1-3 increased with one hundred, whereas the identical parts are indicated by the same reference numerals.

The feeding device 109 is also in this embodiment mounted on one side of the grinding chamber and it comprises a box-like feeding pocket 110 provided with a horizontal intermediate bottom 110a positioned in the same level as the bottom 5a of the grinding chamber. The outer sluice 113 of the feeding pocket is mounted at the outer end of the feeding pocket in parallel with the inner sluice 116.

The pushing device 117 comprises a hydraulic cylinder 119 fastened under the grinding chamber, said hydraulic cylinder being provided with a piston rod 125 which is parallel with the rotation axis of the grinding stone and extends under the intermediate bottom of the feeding pocket through the feeding pocket, when the piston shaft is in its extended position. A pushing plate 118 which is parallel with the sluices is fastened at the end of the piston rod. A slot 126 which is parallel with the piston shaft is provided in the intermediate bottom for a plate-like support 127 of the pushing plate. The outside dimensions of the pushing plate are slightly smaller than the free internal cross-section of the feeding pocket so that the pushing plate is displaceable by means of the hydraulic cylinder into and through the feeding pocket up to its outlet opening 114.

Figure 10:
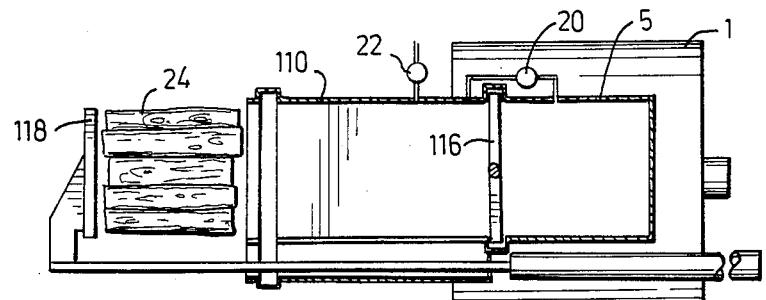

The feeding device shown in FIGS. 7-9 operates as follows:

After the feeding pocket is closed from the pressurized grinding chamber by closing the inner shutter 116 and the valve 20 of the pressurizing pipe, the valve 22 of the depressurizing pipe and the outer shutter 113 of the feeding pocket can be opened. The pushing plate 118 is displaced out from the feeding pocket 110 to its outer extreme position by means of the hydraulic cylinder. The transfer device can now transfer the wood batch 24 into the space between the pushing plate and the feeding pocket, as shown in FIG. 10.

The pushing plate pushes the wood batch into the feeding pocket, whereafter the outer shutter 113 of the feeding pocket is closed. The feeding pocket is pressurized by closing the valve 22 and opening the valve 20, as shown in FIG. 11.

Thereafter the inner shutter 116 of the feeding pocket is opened and the wood batch is pushed into the grinding chamber 5 by the pushing plate, when the shoe 8 is in its retracted position. After the inner shutter and the valve 20 have been closed, the grinding can be started, as shown in FIG. 12.

It is noted that the transfer of the wood batch into the feeding pocket and from the feeding pocket into the grinding chamber entirely takes place in a horizontal plane in parallel with the rotation axis of the grinding stone, whereby there is no need to drop the wood batch during the feeding operation and the order of the batch is maintained.

After the wood batch is ground, the valve 20 of the pressurizing pipe is closed and the valve 22 of the depressurizing pipe opened so that the feeding pocket 110 is depressurized. After the outer shutter has been opened, a new wood batch can be fed into the feeding pocket and further into the grinding chamber.

The outer sluice of the feeding pocket is preferably capshaped, as shown in FIGS. 13 and 14. The feeding device 209 comprises an outer pressure-tight cylindrical shell 211, which forms a box-like feeding pocket 210. The outer sluice 213 of the feeding pocket is formed by a spherical cap which is fastened by means of arms on co-axial shafts 214, which are rotatably mounted in the outer shell. One shaft extends outside the shell and is connected to an operating device for turning the shaft.

In the closed position the cap shutter is tightly pressed against a ring-shaped sealing 215 provided in the pressure shell 211 and in the opened position it is turned into a space between the feeding pocket and the pressure shell. Also this construction makes it possible to position the cylinder device 117, which operates the pushing plate 118, above the feeding pocket, whereby the cup shutter is turned under the bottom of the feeding pocket in the opened position.

The drawings and the description relating thereto are only intended to illustrate the idea of the invention. The details of the method and the feeding device according to the invention may vary within the scope of the claims. Therefore, it is possible that the bottom of the feeding pocket is not quite horizontal but is tilted, though only to such an extent that the wood stocks remain essentially parallel during the feeding operation.

We claim:

1. A feeding device for a pressure grinder, comprising a frame forming a continuously pressurizable grinding chamber;

a rotating grinding means mounted in the grinding chamber;

a feeding device attached to the grinding chamber and forming a pressurizable feeding pocket for feeding a wood batch into the grinding chamber, an inlet opening of the feeding pocket for the wood batch being positioned in the substantially horizontal direction and an outlet opening to the grinding chamber;

closing means for pressure-tight closing of the pressurizable feeding pocket from the atmosphere and from the grinding chamber respectively so that said wood batch is transferred from said pressurizable feeding pocket into said pressurizable grinding chamber under pressure;

a pressing element for pressing the wood batch against the grinding means in the grinding chamber;

the feeding device being positioned on a side of the grinding chamber in a such manner that a bottom of the feeding pocket is essentially in the same substantially horizontal level with the bottom of the grinding chamber;

the feeding device being provided with pushing plate means displaceable in the feeding pocket in the direction of an axis of said grinding means substantially parallel with said bottom level;

said pushing plate means is connected to and displaced by an operating device, a path of movement of said plate means extending from said outlet opening through and outside the feeding pocket to a distance from the inlet opening of the feeding pocket exceeding the length of the wood batch to form a receiving space for the wood batch between said pushing plate means and the inlet opening of the feeding pocket.

2. Feeding device according to claim 1 wherein the feeding device comprises a box-like feeding pocket and a cylindrical presssure shell surrounding said pocket, an outlet opening being provided having shutters to be opened and closed, said outlet is provided for the feeding pocket at one end of the pressure shell adjacent the grinding chamber, a cover is rotatably mounted in the pressure shell and forming an inlet opening for opening and closing of the feeding pocket.

3. Feeding device according to claim 1, wherein the inlet opening of the feeding pocket is positioned at the opposite end of the feeding pocket with respect to an outlet opening to the grinding chamber.

4. Feeding device according to claim 1, wherein the inlet opening of the feeding pocket for the wood batch is positioned on a vertical side of the feeding pocket with respect to the outlet opening to the grinding chamber.

5. Feeding device according to claim 1, wherein the wood batch is one single, compact wood batch of logs superimposed one upon the other and is formed outside of the pressurizable feeding device.

* * * * *